Patented Dec. 17, 1929

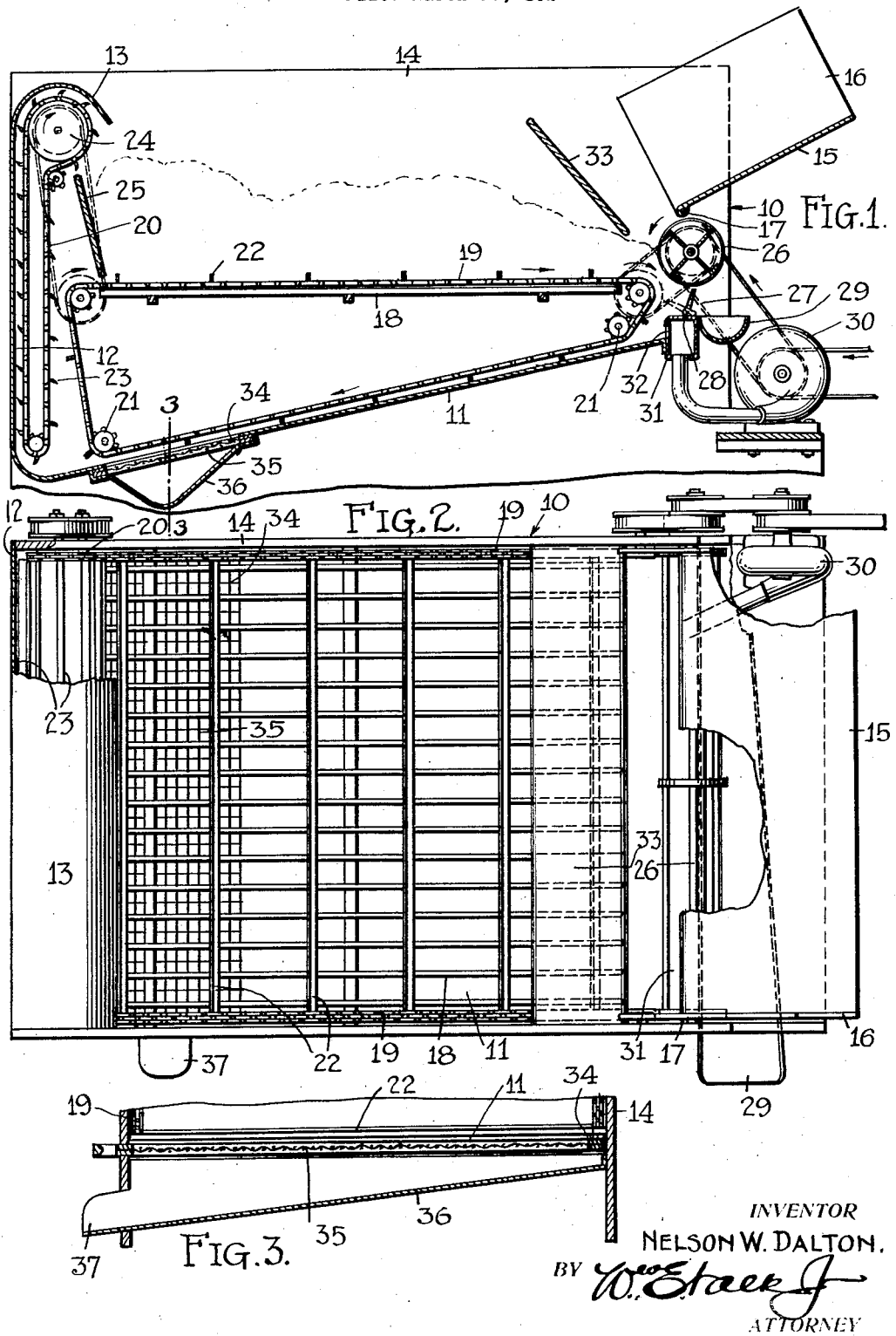

1,740,075

UNITED STATES PATENT OFFICE

NELSON W. DALTON, OF BATH, NEW YORK, ASSIGNOR TO PEQUOD REALTY CORPORATION, OF NEW YORK, N. Y., A CORPORATION OF NEW YORK

DRIER FOR AGRICULTURAL PRODUCTS

Application filed March 10, 1927. Serial No. 174,193.

My invention relates to driers for agricultural products and is concerned more particularly with a drier for such agricultural products as hay, grass, sheaf grain, straw, bean pods, or the like.

An object of the invention is to provide, in a drier for agricultural products, a circulatory system in which the products to be dried are repeatedly circulated in an endless path and during such circulation are alternately subjected first to the drying influence of a blast of air and thereafter, throughout a period of greater duration, to the drying influence of the escaping air as it rises within and escapes from the confining walls of the drier.

A further object of the invention is to provide, in a drier thus characterized, means for loosening the products to be or in the process of being dried, said means being so related to said circulatory system as to loosen said products immediately preceding the discharge thereof into the direct air blast of the drier.

A further object of the invention is to provide a system of endless conveyors by means of which the products in circulation, after first being partially dried under the influence of the direct air blast, are conveyed or reconveyed, as the case may be, across the path of the rising or escaping air back again to the point from whence such circulation began or started.

A still further object of the invention is to provide at the point from where circulation both begins and ends, an adjustable guide or baffle, said guide or baffle, in one position of adjustment, affording a means whereby the products to be or in the process of being dried are directed toward and into the drier, and said guide or baffle, in a different position of adjustment, affording a means whereby the dried or cured products are directed away from and out of the drier.

Other objects and advantages of the invention, such for instance as the screening feature, the scraping action, the constructional details, etc., will be hereinafter more fully described.

In the drawings, wherein like reference characters denote like or corresponding parts, Fig. 1 is a longitudinal sectional view of the drier;

Fig. 2 is a plan view (partly broken away), and

Fig. 3 is a section on the line 3—3 of Fig. 1.

In the embodiment of the invention selected for illustration a container, designated in its entirety as 10, is shown. Such container comprises an inclined bottom wall 11, an end wall 12 having its upper end portion 13 carried inwardly as shown, and side walls 14 between which the bottom wall 11 and the end wall 12 are disposed. Said container 10 is preferably open at one end (hereinafter referred to as the forward end) and at the top. At said open end, and between the side walls 14 of the container a feed platform 15, having side walls 16, is pivoted as at 17. This platform 15 is adjustable vertically and is preferably so inclined as to feed by gravity the products into the container. Within the container, and likewise extending from one to the other of the side walls 14 thereof, a drying rack 18 is arranged. Preferably said rack is open throughout its entire length and extends substantially throughout the full length of the container.

The conveyor systems by means of which the products to be or in the process of being dried are kept constantly in motion during a drying operation, comprises a horizontally extended endless conveyor 19 and a vertically extended endless conveyor 20. The sprockets 21, of which there are four, over which the conveyor 19 is carried, are so positioned within the container 10 as to lead said conveyor across the top wall of the drying rack 18 and along the bottom inclined wall 11 of the container. Like the drying rack 18 said conveyor is open throughout, except for cross-slats 22, spaced at intervals along its length. By extending the conveyor 19 along the top face of the drying rack 18, the products to be or in the process of being dried are carried slowly along said rack toward the forward end of the drier and by extending said conveyor along the bottom inclined wall 11 of the container, said bottom wall is scraped clean under all operating conditions. The endless conveyor 20 is mounted at the rear end of the container and is adapted to operate at a higher rate of speed than the conveyor 19. Its function is that of an elevator. Throughout its length it is provided with cross-members 23 which are adapted to pick up the products in circulation and deposit or redeposit, as the case may be, such products onto that area of the conveyor 19 carried across and above the drying rack 18. The inturned portion 13 of the rear container wall beneath which the upper sprocket 24 of the conveyor 20 is located, serves as a guide by means of which the products lifted by said conveyor are directed onto the drying rack. To prevent said products from falling backwardly and against said conveyor 20 when discharged therefrom at the top thereof, a stripper rack 25 is provided.

At the forward end of the container 10, and likewise extended from one to the other of the side walls 14 thereof, I provided a beater 26. This beater 26 is rotatable in a counter-clockwise direction at the forward end of the conveyor 19 and directly beneath the feed platform 15. Its function is to disintegrate and loosen the products directed thereagainst by the movement of the conveyor 19 and by gravity from the feed platform 15, and by mounting said beater at the point indicated, the products acted upon are directed downwardly between said beater and said conveyor 19 to a point from which said products may be either directed again into the drier or away from the drier according to whether or not said products have been completely dried and cured.

The means for guiding said products at the point of discharge consists of a suitable guide or baffle 27 pivoted as at 28 directly beneath the beater and at a point forwardly removed from the discharge terminus of the conveyor. In one position of adjustment, i. e., in that position illustrated in full lines in Fig. 1, said guide or baffle 27 directs the products acted upon in a downward direction and into the drier. In the dotted line position of said figure, said baffle 27 acts as a barrier preventing said products from entering within the drier. In said latter position the baffle 27 directs the products onto a discharge sheet 29, extended across the forward end of the container. The drying action within the container 10 is produced by the introduction thereinto of a strong blast of heated air. To this end a blower 30, suitably connected with a heater or furnace (not shown) is provided. From the blower 30 the air enters a wind box 31 extended from one to the other of the side walls of the container at or near the discharge end of the conveyor 19. Said wind box has formed therein, directly above the bottom inclined wall 11 of the container, an opening or slot 32 by means of which air is admitted to the container in a plane below the drying rack 18. The air thus admitted comes in contact with the products acted upon as said products are directed downwardly and into the drier by the baffle 27. As the volume of air at such point within the drier is more or less concentrated, the products, immediately after having been loosened by the beater 26, are carried rapidly along the inclined wall 11 toward the rear end wall 12 of the container. At this point the conveyor 20 picks up such products and deposits or redeposits them upon the drying rack 18. The air upon entering the container 10, escapes therefrom in an upward direction and accordingly rises within the container thru the drying rack 18 and thru the products deposited thereon and moved across the path of air by the conveyor 19. It will be seen, therefore, that not only are the products subjected to the direct air blast but that they are subjected further to the drying influence of the rising or escaping air thus undergoing two distinct and wholly independent drying actions. To deflect the products in a downward direction as said products are carried forwardly along the drying rack 18, a terminal rack 33 is provided. This rack 33 functions also a deflector by means of which the products fed into the drier from the feed platform 15 are forced against the beater 26.

As it is intended that the drier shall be used for drying bean pods and other agricultural products of a similar nature, I provide in the bottom wall of the container, and preferably at the rear end thereof, an opening 34. Such opening may or may not be provided with a screen 35 thru which the beans or other grain loosened by the beater 26 are free to fall. Beneath said screen, which is preferably removable for the substitution of a screen of different mesh, a hopper 36 is disposed. Within such hopper the beans or other grain are collected. If desired, a screw conveyor 37 may be mounted at one end of said hopper to carry off the grain directed thereinto.

In operation, the products to be dried are deposited onto the feed platform 15 which is adjustable. From said platform the products are fed against the beater 26. With the baffle 27 positioned as indicated by the full lines of Fig. 1, the products are carried into the drier and directly into the stream of escaping air. By the air rush, the products are picked up and carried along the bottom wall of the container toward its rear end. At this stage in the drying operation the products are subjected to the drying influence of the air as it issues from the wind box 31. From the rear end of the container the products are lifted by the conveyor 20 and deposited onto the drying rack 18 where they are again subjected to the drying influence of the air as it rises within the container and escapes thru the open top. The conveyor 19 in its travel carries the products, during the drying thereof, toward the forward end of the container. Should the products, at this stage, be not dried, said products may be recirculated thru the container and again subjected to the two distinct influences previously described. On the other hand, should said products be thoroughly dried or cured, such products can by merely shifting the position of the baffle 27 be directed onto the discharge sheet 29 where, by any suitable means such products may be carried away.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A drier for agricultural products including a container for the products to be dried, a conveyor operable within said container to move said products, during the drying thereof, toward a point of discharge, means operable to liberate within said container in the vicinity of said point of discharge a blast of air by means of which the discharged products are carried toward that end of the container remote from said point of discharge, and means operable within said container to redeposit upon said conveyor the products acted upon by said blast of air.

2. A drier for agricultural products including a container for the products to be dried, said container having formed therein an outlet passage, a conveyor operable within said container to move said products, during the drying thereof, toward said passage, an adjustable baffle mounted at one end of said conveyor to direct said products either thru or away from said passage as desired, means operable to liberate within said container in the vicinity of said baffle a continuous blast of air by means of which the products directed away from said passage are carried toward that end of the container remote therefrom, and means operable to redeposit upon said conveyor the products acted upon by said blast of air.

3. A drier for agricultural products including a container for the products to be dried, a drying rack for said products, a conveyor operable within said container to move said products along said rack toward one end of said container where said products are discharged from said rack, means operable to liberate within said container below said rack and in the vicinity of said point of discharge a continuous blast of air by means of which the products discharged from said rack are carried toward that end of the container remote from said point of discharge, and means operable to redeposit upon said rack the products acted upon by said blast of air.

4. A drier for agricultural products including a container for the products to be dried, a conveyor operable within said container to move said products, during the drying thereof toward a point of discharge, a beater operable at said point of discharge to loosen and at the same time deflect the discharged products in a downward direction, means operable to liberate within said container in the vicinity of said point of discharge and beneath said beater a continuous blast of air by means of which the discharged products are carried toward that end of the container remote from said point of discharge, and means operable to redeposit upon said conveyor the products acted upon by said blast of air.

5. A drier for agricultural products including a container for the products to be dried, a drying rack enclosed within said container, means operable to slowly move said products along said rack toward one end of said container, means operable to liberate within said container a continuous blast of air by means of which said products are carried toward the opposite end of said container, means operable to redeposit upon said rack the products acted upon by said blast of air, and a beater operable to loosen said products while in motion.

6. A drier for agricultural products including a container for the products to be dried, a feed platform terminating at one end within said container, a discharge chute within said container, a beater operable within said container between said feed platform and said discharge chute, means operable within said container for keeping said products constantly in motion during the drying thereof, said last mentioned means terminating at one end in the vicinity of said beater, a baffle operable to direct the products acted upon by said beater either onto said discharge chute or back again into said container according to whether or not said products are thoroughly dried, and means operable to liberate within said container a continuous blast of air by means of which said products are thoroughly dried while in motion.

7. A drier for agricultural products including a container for the products to be dried, a conveyor operable within said container to move said products during the drying thereof toward a point of discharge, a beater operable within said container to thrash and loosen said products, means operable to liberate within said container and below said beater a continuous blast of air, and a removable screen mounted in the bottom of said container for screening the grain loosened by said beater.

8. A drier for agricultural products including a container for the products to be dried, a feed platform terminating at one end within said container, a discharge chute leading off from said container at a point substantially beneath the discharge end of said platform, means for liberating within said container a drying air blast, means operable within said container for conducting the drying products away from and thence back again toward said discharge chute, and a beater for the products acted upon interposed between the discharge end of said feed platform and said chute.

In testimony whereof I hereunto affix my signature.

NELSON W. DALTON.